(12) United States Patent
Foster et al.

(10) Patent No.: US 6,915,687 B2
(45) Date of Patent: Jul. 12, 2005

(54) AERODYNAMICALLY SHAPED STATIC PRESSURE SENSING PROBE

(75) Inventors: Roger D. Foster, Burnsville, MN (US); Paul F. Heine, Eagan, MN (US); Patrick J. Moynihan, Lakeville, MN (US); David G. Owens, Bloomington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/611,708

(22) Filed: Jul. 1, 2003

(65) Prior Publication Data

US 2005/0000280 A1 Jan. 6, 2005

(51) Int. Cl.[7] ............................................... G01P 13/00
(52) U.S. Cl. .................................................... 73/170.02
(58) Field of Search ............................. 73/170.02, 180, 73/182

(56) References Cited

U.S. PATENT DOCUMENTS

| | | | |
|---|---|---|---|
| 3,482,445 A | 12/1969 | DeLeo et al. ................... 73/182 |
| 4,378,697 A | * 4/1983 | DeLeo et al. ................... 73/182 |
| 4,730,487 A | 3/1988 | Hagen et al. .................... 73/182 |
| 5,025,661 A | * 6/1991 | McCormack .................... 73/180 |
| 5,099,686 A | 3/1992 | Kohler ........................... 73/182 |
| 5,233,865 A | 8/1993 | Rossow ........................... 73/147 |
| 5,616,861 A | * 4/1997 | Hagen ............................. 73/180 |
| 5,731,507 A | 3/1998 | Hagen et al. .................... 73/182 |
| 6,490,510 B1 | * 12/2002 | Choisnet ......................... 701/14 |
| 6,609,421 B2 | * 8/2003 | Cronin et al. ............... 73/170.02 |

FOREIGN PATENT DOCUMENTS

| | | |
|---|---|---|
| EP | 1 255 118 A | 11/2002 |
| WO | WO 99/61923 A | 12/1999 |

* cited by examiner

*Primary Examiner*—Edward Lefkowitz
*Assistant Examiner*—Andre Allen
(74) *Attorney, Agent, or Firm*—Westman, Champlin & Kelly, P.A.

(57) ABSTRACT

A static pressure sensing probe has an aerodynamically shaped cross section, and extends laterally from an aircraft surface sufficiently so that an outer end of the probe is a short distance outside the boundary layer on the aircraft surface on which the probe is mounted. The probe has surface corrugations or ridges along the probe, and the ridges include an upstream ridge adjacent the leading edge, and a downstream ridge spaced rearwardly from the upstream ridge. The ridges cause pressure disturbances along the probe surfaces. Static pressure sensing ports are positioned on the surfaces of the probe relative to the ridges in regions of pressure disturbances caused by the ridges. The probes can be mounted on opposite sides of the aircraft and pneumatically or electrically connected to average the pressures from selected sets of ports.

22 Claims, 4 Drawing Sheets

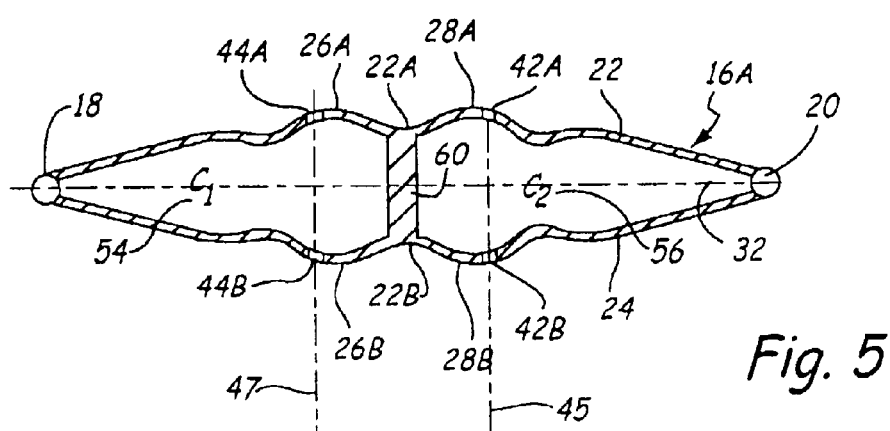
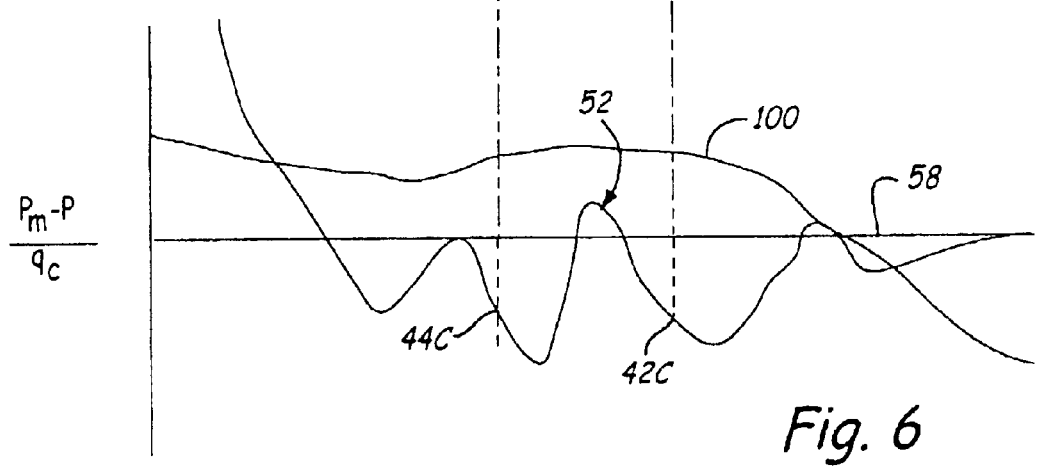

AERODYNAMICALLY SHAPED STATIC PRESSURE SENSING PROBE

BACKGROUND OF THE INVENTION

The present invention relates to an aerodynamically shaped, aircraft mounted static pressure sensing probe that extends a short distance outwardly beyond the boundary layer on the surface of the aircraft, and provides reliable static pressure measurements, with a low drag configuration.

Various static pressure sensing probes have been advanced in the prior art, some of which include configurations that modify the static pressure sensed at locations along the probe. U.S. Pat. No. 4,730,487 shows a strut mounted probe, that has static pressure sensing ports on the surface, with pressure modifying surface irregularities provided. A strut mounted dual static tube or probe is shown in U.S. Pat. No. 3,482,445.

The strut mounted probes as shown in the prior art add drag, and weight, and while reliable, the desirability of having small, lightweight, low drag probes that will withstand reasonable impacts exists. The probes also need to provide reliable static pressure sensing with accuracy needed to meet present reduced vertical separation minimum (RVSM) requirements of air traffic control.

Static pressure sensing ports in flush plates, that form continuations of the aircraft surface, are affected by the skin waviness of an aircraft, as well as the boundary layer of air on the skin. The strut mounted pitot static probes that are used do extend outside the boundary layer, but the strut mounted probes also require substantial amounts of power for heating to prevent icing. Since a strut is used, there is relatively high drag and weight. The increasing demands on accuracy in maintaining vertical separation for the flight levels for civil aircraft under positive control of the air traffic control system have required greater accuracy in sensing static pressure, and flush sensor plates with static ports generally do not meet these accuracy requirements.

SUMMARY OF THE INVENTION

The present invention relates to a short, lightweight, aerodynamically shaped probe that extends only sufficiently far from the surface of an aircraft so as to protrude outside of the boundary layer on an aircraft skin. The probe cross section is generally aerodynamically shaped, that is, with a small radius leading edge, an increase in thickness in the center and tapering down to a narrower trailing edge. The top and bottom surfaces of the probe are both provided with surface corrugations, which are ribs or ridge-like irregularities generally perpendicular to the air flow direction that form surface corrugations. These surface ridges have rounded tops that extend outwardly along the length of the probe from the base to the outer end of the probe. The ridges are joined by smoothly curved, outwardly facing valley surfaces. The top and bottom surfaces of the probe thus are corrugated and can be said to undulate.

The corrugations formed by the ridges and valleys affect the pressure sensed at ports in or adjacent to the ridges. Air flow across the corrugations causes a change or difference in static pressure at the position of the ports. Different fore and aft locations of the corrugations can be selected to provide a static pressure signal that compensates for the surface irregularities of the aircraft skin.

Because the ports can be located just outside the boundary layer on the surface of the aircraft, and the port position with respect to the corrugations can also be adjusted, the accuracy of the sensed pressure is enhanced and the vertical separation minimum requirements for aircraft can be achieved.

BRIEF DESCRIPTION OF THE DRAWINGS

FIG. 5 is a cross sectional view taken on line 5—5 in FIG. 4; and

FIG. 6 is a plot of the pressure distribution on an upper surface of the static pressure probe related to the cross sectional view of FIG. 5.

DETAILED DESCRIPTION OF THE PREFERRED EMBODIMENTS

Figure 1:
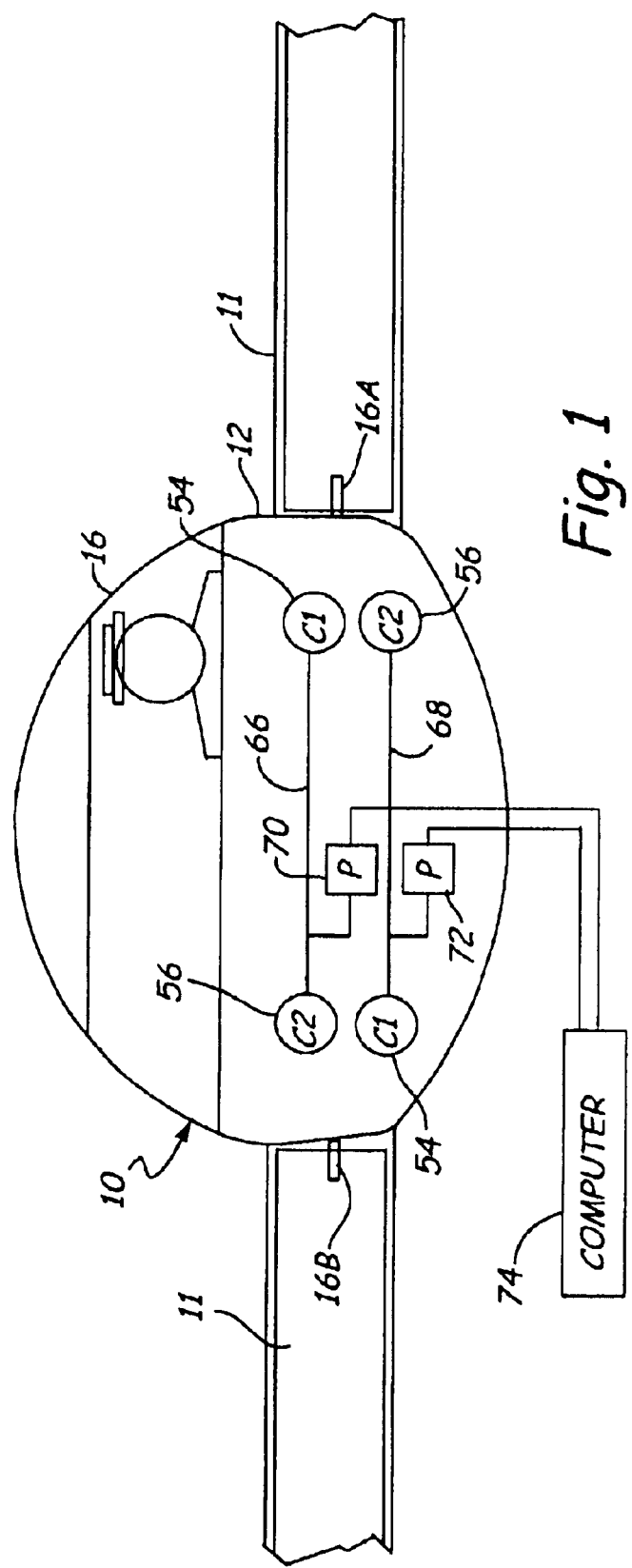
FIG. 1 is a front elevational view of an aircraft having static pressure probes made according to the present invention installed thereon.
Figure 2:
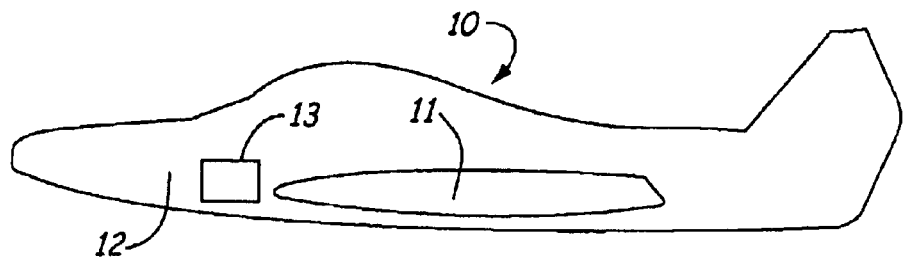
FIG. 2 is a fragmentary side view of an aircraft to show a mounting region for the static pressure probes of the present invention.
Figure 3:
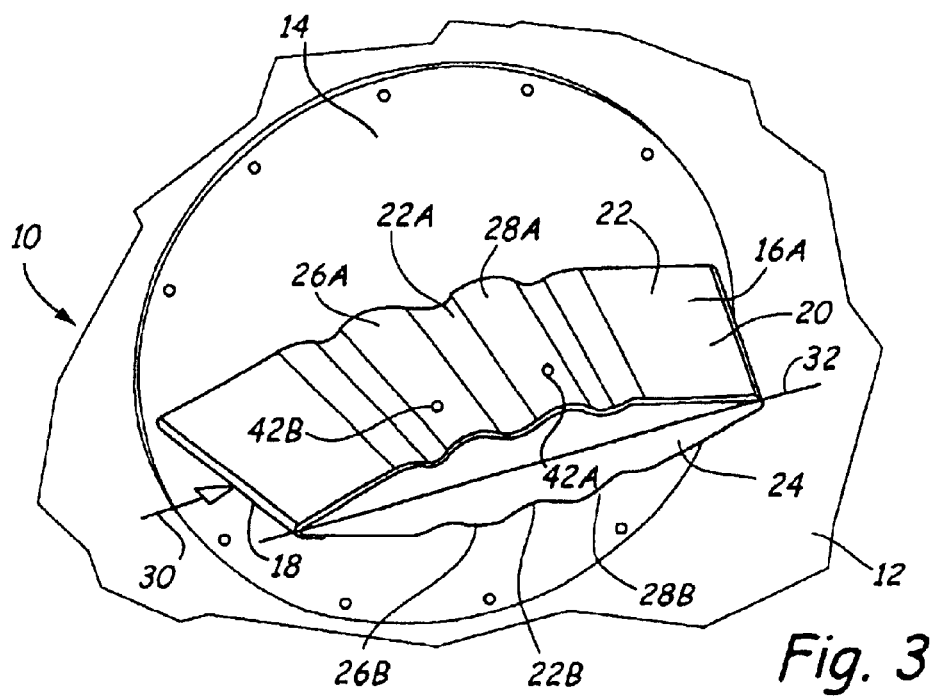
FIG. 3 is a perspective schematic view of a self-compensating, aerodynamically shaped static pressure probe made according to the present invention.
Figure 4:
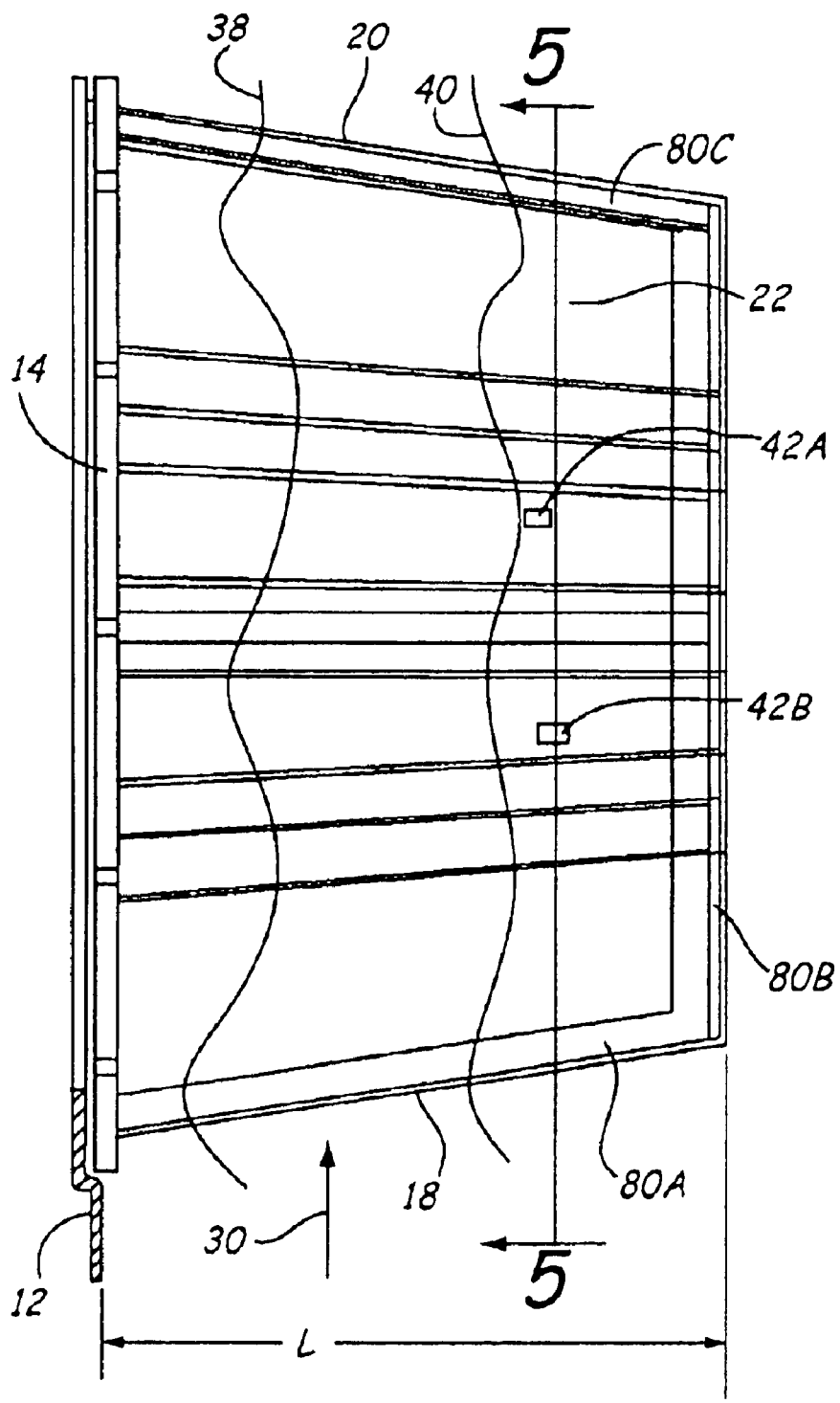
FIG. 4 is a top plan view of the probe of FIG. 1.

Referring to FIGS. 1 and 2, an aircraft indicated generally at 10 is shown with only a fragmentary portion illustrated. The aircraft skin 12 is used to mount two static sensing probes 16A and 16B made according to the present invention. The probes are on opposite sides of the aircraft ahead of the aircraft wings 11. A mounting base plate 14 (FIGS. 3 and 4) mounts the respective static sensing probe to the aircraft skin. In FIGS. 3 and 4, probe 16A is illustrated, but probe 16B is construed as a mirror image of probe 16A. The static sensing probes 16A and 16B each have an aerodynamically shaped cross section, as shown in FIG. 5, and include a relatively thin, rounded leading edge 18, a trailing edge 20, an upper surface 22 on an upper wall 22A and a lower surface 24 on a lower wall 24A. Portions of the upper and lower surfaces adjacent the leading and trailing edges that is, ahead of or behind the ridges are convex surfaces that are a general airfoil shape.

The corrugations are formed by upstream or first ridges or raised sections 26A on the top and 26B on the bottom of the probe and positioned to the rear of the leading edge 18. The ridge surfaces smoothly blend with center surface portions 22A and 22B forming a valley. The valley surface portions join downstream or second ridges or raised sections 28A and 28B on the top and bottom, respectively, with respect to the direction of airflow, which is indicated by arrow 30. The size and spacing of the ridges are selected to provide variations in sensed pressure that permits placing the ports at locations that provide a compensation static pressure which offsets the static pressure error at the aircraft skin surface. The ridge cross section shapes can be as shown, but sharp ridges and planar surfaces forming the valleys can be provided. The peak heights are selected to provide a sufficient change in static pressure to provide the needed change for compensation.

The lower surface ridges 26B and 28B are preferably mirror images of the upper surface ridges 26A and 28A. Thus the upper and lower surfaces of the probe are shown as symmetrical with respect to a fore and aft extending bisecting plane 32. It is recognized that multiple ridges (shapes) could also be used to provide additional pressure sensor options/outputs. The first and second ridges on the same surface also can be different size or height. The symmetrical top and bottom side shape are helpful in avoiding the need for calculated compensation during angle of attack changes, as will be discussed. The top and bottom ridges can be offset in fore and aft directions, but changes in shape or size of the ridges will result in different pressure profiles across the ridges. This provides different pressure levels in which to place pressure sensing ports, but complicates measurements made at different angles of attack.

In FIG. 2, a location for the static pressure probe of the present invention is represented by the area within block 13. The static pressure probe is preferably out of flow disturbances caused by the aircraft wings 11.

Referring to FIGS. 3 and 4, the aircraft skin 12 has a side surface 36, and it is well known that as air flows along this surface 36, there is a boundary layer of air that essentially is stagnant on the aircraft skin, and the thickness, or the outwardly extent, of this boundary layer varies with the speed of the aircraft on which the probe is mounted. Boundary layer configurations can also vary on different aircraft. In FIG. 4, a line 38 generally represents the boundary layer outer extent during high speed flight, that is, over 0.6 mach or so, and line 40 represents the outer extent of the boundary layer for much lower speeds. It can be seen that the boundary layer thickness, or outward extent, is greater at lower speeds.

The length of each of the aerodynamically shaped static pressure probes 16A and 16B from the base to the outer end as indicated at L, is measured perpendicular to the airflow direction 30 in FIG. 3. The length L is kept relatively short, generally less than about 7.5 cm to 10 cm, since the outer extent of the boundary layer is usually less than 5 cm at the typical probe mounting location for conventional aircraft, and even at low flight speeds.

The corrugations formed by ridges 26A, 26B, 28A and 28B create a changing pressure distribution across the upper and lower surfaces of the probes 16A and 16B as air flows along the probe surfaces. Static pressure sensing ports at typical locations 42A and 44A through the upper wall 22A of the probe, and at 42B and 44B through the lower wall 22B of the probe are shown in FIG. 5. The interior of each of the probes 16A and 16B is formed into a pair of hollow chambers $C_1$, also marked as 54, and $C_2$ also marked as 56. The chambers 54,56 are divided by a wall 60 that extends along the length of the probe 16 (see FIG. 4). The top and bottom ports 44A and 44B are located at a first pressure level as will be shown, and both open to chamber $C_1$ (54). The top and bottom ports 42A and 42B are also located at a second pressure level, and both open to chamber $C_2$ (56).

FIG. 6 is a typical plot of pressure along upper surface 22 of the probe 16A, with its aerodynamic shape and with the smooth ridges or corrugations extending laterally outward from the side of the aircraft.

A standard pressure function used to normalize differences between local static pressure and measured pressure is the function $$\frac{P_m - P}{q_c}.$$

Where $P_m$=measured pressure, P is local static pressure, and $q_c=(P_t-P)$, where $P_t$ is true pitot pressure or impact pressure and P in the $q_c$ equation is true static pressure. The normalized function is a dimensionless quantity.

Using the normalized pressure ratio function $$\frac{P_m - P}{q_c}$$

plotted on a vertical line in FIG. 6 with the linear positions on the probe from the leading edge 18 to the trailing edge 20 along the horizontal line, a plot or curve 52 is developed. The pressure along the top and bottom probe surfaces is measured during wind tunnel testing using conventional techniques well known to those skilled in the art. It can be seen that the normalized pressure function varies along the probe surface as shown in FIG. 6. The line 58 represents a constant normalized pressure function value that represents the desired or accurate static pressure condition. Plot 52 shows pressure variations on the probe surfaces. Ports 44A and 44B are on a common vertical plane 47, and are located the same distance rearwardly or downstream from the leading edge 18. The normalized function for the average pressure from both ports 44A and 44B is shown at the point 44C in FIG. 6. This is the static pressure in chamber C.

Ports 42A and 42B are on a common vertical plane 47, and also are located the same distance downstream from the leading edge 18. The normalized function for the average pressure from both ports 42A and 42B is shown at the point 42C. This is the static pressure function in chamber $C_2$.

The pressures at locations corresponding with or aligned with points 42C and 44C on the graph of FIG. 6 are modified by the corrugations so they provide pressure compensation to provide true static pressure on an aircraft shown at 10 in FIG. 2 and are sufficiently accurate to meet the vertical separation standards for aircraft.

The static pressure variation on the aircraft surface over area A shown at 13 is depicted by pressure curve 100. The location 42C is selected to be offset negative relative to line 58 the same amount as curve 100 is offset positive from line 58 where plane 45 intersects curve 100. Plane 47 also is positioned so point 44C is offset the same negative amount from line 58, as the point where plane 47 intersects curve 100 is offset positive.

The normalized pressure function is used to determine desired port locations for the proper compensation. U.S. Pat. Nos. 3,482,445 and 4,730,487 illustrate this type of compensation with cylindrical, strut mounted probes. U.S. Pat. No. 4,730,487 illustrates the capability of sensing a compensation pressure on a wavy or corrugated cylindrical probe at both supersonic and subsonic speeds with a strut mounted probe, and the same static pressure compensation and determination can be made with the short aerodynamically shaped (air foil shaped) probe of the present invention.

The location of the pressure sensing ports on the probe where the desired pressure level is present can be determined by a wind tunnel test, or by calculations from computer simulation, and then the ports are formed through the top and the bottom walls of the probe. The proper location of the static ports is determined in conjunction with a pressure field at the mounting location on a particular aircraft as described above.

The corrugated shape allows use of a probe of the same structure design on a variety of aircraft shapes and locations by changing the port locations with respect to the corrugations based on wind tunnel tests or calculations for the particular aircraft. The pressures at both of the forward ports 44A and 44B adjacent to the corrugations 26A and 26B are provided to chamber $C_1$ (54) and thus the pressure in chamber $C_1$ is an average of these sensed pressures at ports 44A and 44B. The rearward ports 42A and 42B associated with the corrugations 28A and 28B are open to chamber $C_2$ (56) and thus pressure in chamber $C_2$ is an average of the pressures at ports 42A and 42B. With this placement of the top and bottom ports and averaging the pressures, changes in angle of attack will not offset the pressure in chambers $C_1$, and $C_2$.

Further, as shown in FIG. 1, the pressure in chamber $C_1$, (54) of probe 16A on the left side of the aircraft is fluidly coupled to chamber $C_2$ (56) of probe 16B on the right side with a fluid line 66, and thus the pressure in line 66 is an average of fluidly connected chambers $C_1$ of probe 16A and $C_2$ of probe 16B. The chamber $C_2$ of probe 16A is fluidly connected with the chamber C, of probe 16B with a fluid line 68. The pressure in line 68 is thus an average of the pressures in chambers $C_1$ of probe 16B and $C_2$ of probe 16A. Averaging the pressure from chambers of the probes on opposite sides of the aircraft insures that changes in angle of sideslip of the aircraft do not adversely affect the pressure signal provided.

The pressures from lines 66 and 68 are provided to pressure transducers 70 and 72, or other pressure measuring devices, respectively as shown in FIG. 1. These pressure transducers will provide electric signals indicating the pressure being sensed to an onboard computer 74, or the signals can be used in connection with a smart probe computer, for indicating the static pressure.

It is recognized that instead of pneumatically averaging the pressures in the chambers of the probes 16A and 16B on opposite sides of the aircraft, the pressures in the respective chambers can be sensed with pressure sensors connected to each chamber, to provide serparate electrical signals indicating the pressures. The electrical signals from the pressure sensors can be electrically averaged with a suitable circuit, as desired.

The smoothly contoured aerodynamic shape of the short probe extends just outside the boundary layer, reducing the drag, reducing the weight, and also reducing the power required for deicing because of the smaller size compared to a strut mounted probe of the prior art.

Schematically shown in FIG. 4 is a resistance heater assembly 80, that, as shown, includes a heater section 80A along the leading edge of the probe, a heater section 80B on the end of the probe, and a heater section 80C along the trailing edge of the aerodynamically shaped probe. The heater assembly 80 raises the temperature of the probe in the manner known in the art to provide anti-icing and de-icing capabilities. It has been found that with the short probe of the present invention, and the aerodynamic shape, the amount of energy needed to complete the deicing is reduced substantially. For example, in a typical strut mounted probe, deicing requires in the range of 450 watts, while the power required for deicing the short aerodynamic probe of the present invention, which extends just outside the boundary layer, is less by an amount which is a function related to its smaller size and mass.

Other types of heaters can be provided and the heater or heaters also can be placed in different locations on the probe. Heaters can be placed on lines 66 and 68 to reduce or eliminate water ingestion, for example.

The surface ridges comprise corrugations or undulations on the surface of an aerodynamically shaped cross section probe that disrupts and changes the pressure distribution in a predictable and determinable manner, such that static pressure sensing ports can be located in the pressure field caused by the irregularities, and used for indicating true static pressure when the aircraft flow is considered for determining the location of the static ports.

The probe can be made of suitable materials, such as metal, composite materials, or even plastic, or any combination. The probe extends through the boundary layer of the aircraft.

The waves, ridges, or corrugations have lengths that extend perpendicular to the normal air flow across the sensor. A family of probes can be designed capable of covering a series of aircraft that have approximately the same fuselage shape, and the same air speed ranges.

The probe can provide single or multiple static source measurements. The probe can be heated for deicing as disclosed, or if desired other deicing systems can be used, such as a vibration or impact deicing system. Ultrasonic generators that send vibrations through the probe can also be used.

The location of the static pressure sensing ports can be selected for the type of aircraft and the aircraft design speed. This will permit the family of probes to be used with the same wavy configuration, but with the ports located at a different location to provide compensated static pressure signals for a particular aircraft.

Also, multiple ridges more than those shown, and additional chambers and ports positioned on or adjacent the ridges will allow multiple (more than 2) pressure outputs. This increases the probes pressure sensing and pressure compensation capabilities.

Selecting the appropriate location for the ports can be done by wind tunnel tests or by calculations based on flight or wind tunnel information. The corrugations on the top and bottom do not have to be symmetrical or perfectly aligned, although the symmetrical and vertically aligned arrangement shown is preferred because the pressure sensed at the ports on the top and bottom surfaces change as angle of attack changes. When the top and bottom ports are aligned, as shown, so the pressures sensed are equal at zero angle of attack when one port senses a change in pressure, the aligned port will sense the same change, but it will of opposite sign (one raises and the aligned port reduces). Averaging the pressures from the aligned top and bottom ports results in the chamber pressure ports being unaffected by angle of attack changes.

Although the present invention has been described with reference to preferred embodiments, workers skilled in the art will recognize that changes may be made in form and detail without departing from the spirit and scope of the invention.

What is claimed is:

1. A static pressure sensing probe for use with an aircraft, the probe having an aerodynamically shaped cross section and an axial length protruding from a probe base, the aerodynamically shaped cross section extending substantially the entire axial length of the probe, the probe axial length being sufficient so the probe aerodynamically shaped cross section extends beyond a boundary layer of air when the probe is mounted on a surface of an aircraft, at least one surface corrugation on the probe extending along the probe axial length outwardly of the boundary layer from the probe base, and a first pressure sensing port on the probe.

2. The probe of claim 1 wherein the surface corrugation is an upstream corrugation relative to air flowing over the probe, a second downstream surface corrugation on the probe formed substantially parallel to the upstream surface corrugation, a second pressure sensing port on the probe, the first and second pressure sensing ports being positioned adjacent to the upstream and second downstream corrugations at locations to provide a selected static pressure function at each of the pressure sensing ports.

3. The probe of claim 1, wherein said corrugation comprises a ridge raised upwardly from a generally aerodynamically shaped upper surface of the probe.

4. The probe of claim 3 wherein the at least one surface corrugation and the first pressure sensing port are on a top surface of the probe, and further comprising a second bottom corrugation on a bottom surface of the probe, extending along the probe axial length outwardly from the boundary layer from the probe base, and a second pressure sensing port on the bottom surface of the probe.

5. The probe of claim 4 further comprising the second pressure sensing port positioned at a location wherein the sensed static pressure at the second pressure sensing port is at a desired relationship to static pressure sensed at the first pressure sensing port.

6. The probe of claim 5, wherein the second pressure sensing port is positioned at a location wherein static pressures sensed at the first and second pressure sensing ports are substantially equal at a known orientation of the probe relative to airflow across the probe.

7. The probe of claim 5, wherein the probe comprises top and bottom spaced walls having the top and bottom surfaces, the spaced walls forming a pressure chamber, and the first and second ports both opening to the pressure chamber.

8. The probe of claim 2, wherein the corrugations cause a normalized pressure function $(P_m-P)/q_c$ to change at different locations in a direction on the probe substantially parallel to the direction of air flow over the probe, and wherein $P_m$ is measured pressure, P is local static pressure, and $q_c$ is total pitot pressure minus true static pressure.

9. A static pressure sensing probe having a base, an outer end, a leading edge facing in the direction of an air flow, and a trailing edge, the probe cross section perpendicular to a length of the probe between the base and the outer end defining upper and lower surfaces that have convex aerodynamically contoured surface portions adjacent the respective leading and trailing edges, at least a first ridge on at least one surface of the probe extending along the length of the probe, said ridge having sufficient height from the adjacent portions of the one surface to cause a static pressure disturbance of air flowing across the one surface, wherein the local static pressure rises and falls as it flows over the first ridge, a pressure sensing port on the probe positioned adjacent to the first ridge and at a position that is selected to have a different static pressure from the pressures at the convex surface portions.

10. The probe of claim 9, and wherein there is a second ridge on the one surface spaced toward the trailing edge of the probe from the first ridge, and causing a second static pressure disturbance, and a second pressure sensing port on the probe positioned adjacent to the second ridge at a selected position to sense pressure in a region of the second static pressure disturbance.

11. The probe of claim 10, wherein the first ridge and the second ridge are both on the upper surface of the probe.

12. The probe of claim 9, wherein the first ridge is spaced from the leading edge of the probe, and one convex surface portion extending between the first ridge and the leading edge.

13. The probe of claim 10, wherein said aerodynamically shaped cross section has vertically spaced top and bottom surfaces, and the upper and lower surfaces having the convex surface portions tapering toward each other in a downstream direction from the first and second ridges, each of the upper and lower surfaces having first and second ridges and first and second pressure sensing ports.

14. The probe of claim 13 wherein the probe has at least first and second chambers therein, the first pressure sensing ports in both the upper and lower surfaces opening to the first chamber, and the second pressure sensing ports in both the upper and lower surfaces opening to the second chamber.

15. The probe of claim 9, wherein the length of the probe positions the outer end outside of and adjacent to the boundary layer of an aircraft on which the probe is mounted.

16. The probe of claim 9, wherein the length of the probe is maintained to be not substantially greater than 10 cm.

17. A method of forming a family of static pressure sensing probes, with each probe having a base, an outer end, and a length extending between the base and the outer end, and having a generally aerodynamically shaped cross section, at least one corrugation extending along the length of the probe at a location to cause a pressure disturbance comprising rising and falling static pressures as air flows over the corrugation, the method comprising determining a selected air speed of an aircraft on which the probe is to be mounted, and determining an outward extent of a boundary layer of air on a surface of an aircraft at the location where the base of the probe is to be mounted, providing a probe length that positions the outer end outside of but adjacent to the outward extent of the boundary layer, determining the pressure pattern of air flow across the corrugation at the selected air speed, positioning at least one pressure sensing port at a desired location relative to the corrugation where a sensed pressure function is at a desired level, and with the desired location outwardly from the base sufficient to be to the exterior of the outward extent of boundary layer air on the surface of the aircraft on which a probe is to be mounted.

18. The method of claim 17, including providing the family of probes as a separate probe for each of a selected number of different aircraft.

19. The method of claim 17, including providing at least two corrugations on the probe, one being downstream of the other sufficiently far so that a pressure disturbance caused by the upstream corrugation does not substantially affect a pressure disturbance at the downstream corrugation, determining the pressure pattern across both of the corrugations, and selecting a pressure level for positioning at least two ports in the probe, one port adjacent each of the at least two corrugations.

20. A static pressure sensing probe for use with an aircraft, the probe having a leading edge and a trailing edge and having convex upper and lower surfaces between the leading and trailing edges to form an aerodynamically shaped cross section, and the probe having an axial length protruding outwardly from a probe base which is mountable on an aircraft surface, the probe axial length being sufficient so the probe aerodynamically shaped cross section extends outwardly beyond a boundary layer of air when the probe is mounted on a surface of an aircraft, at least one surface corrugation on at least one probe surface, the at least one surface corrugation extending along the probe axial length outwardly of the boundary layer from the probe base, and a pressure sensing port on the at least one probe surface.

21. The static pressure sensing probe of claim 20 wherein the pressure sensing port is in a selected position adjacent to the at least one surface corrugation.

22. The static pressure sensing probe of claim 1 wherein the first pressure sensing port is in a selected position adjacent to the at least one surface corrugation.

* * * * *